(12) United States Patent
Castor et al.

(10) Patent No.: US 8,295,891 B2
(45) Date of Patent: Oct. 23, 2012

(54) UMTS FDD MODEM OPTIMIZED FOR HIGH DATA RATE APPLICATIONS

(75) Inventors: Douglas R. Castor, Norristown, PA (US); Edward L. Hepler, Malvern, PA (US); Michael F. Starsinic, Newtown, PA (US); William C. Hackett, Doylestown, PA (US); David S. Bass, Great Neck, NY (US); Joseph W. Gredone, Chalfont, PA (US); Paul L. Russell, Jr., Pennington, NJ (US); Richard P. Gorman, Ivyland, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 862 days.

(21) Appl. No.: 12/254,531

(22) Filed: Oct. 20, 2008

(65) Prior Publication Data
US 2009/0203409 A1    Aug. 13, 2009

Related U.S. Application Data

(60) Provisional application No. 60/980,826, filed on Oct. 18, 2007, provisional application No. 61/012,605, filed on Dec. 10, 2007.

(51) Int. Cl.
*H04M 1/00* (2006.01)
*H01Q 11/12* (2006.01)
(52) U.S. Cl. ..................... 455/574; 455/127.1
(58) Field of Classification Search .......... 455/574, 455/553, 544, 127.1, 127.2
See application file for complete search history.

(56) References Cited

U.S. PATENT DOCUMENTS

| | | | | |
|---|---|---|---|---|
| 6,806,883 B2* | 10/2004 | Lavelle et al. | | 345/535 |
| 7,496,074 B2 | 2/2009 | Hepler et al. | | |
| 7,502,817 B2 | 3/2009 | Ryan | | |
| 7,663,633 B1* | 2/2010 | Diamond et al. | | 345/503 |
| 8,094,653 B2* | 1/2012 | Hepler et al. | | 370/381 |
| 2003/0005073 A1* | 1/2003 | Yoshizawa et al. | | 709/213 |
| 2009/0309884 A1* | 12/2009 | Lippincott et al. | | 345/502 |

FOREIGN PATENT DOCUMENTS

WO   2007/112781   10/2007

OTHER PUBLICATIONS

Third Generation Partnership Project, "Technical Specification Group Radio Access Network; Medium Access Control (MAC) Protocol Specification (Release 1999)." 3GPP TS 25.321, V3.17.0, (Jun. 2004).

Third Generation Partnership Project, "Technical Specification Group Radio Access Network; Medium Access Control (MAC) Protocol Specification (Release 4)." 3GPP TS 25.321, V4.10.0, (Jun. 2004).

(Continued)

*Primary Examiner* — Charles N. Appiah
*Assistant Examiner* — Emem Stephen
(74) *Attorney, Agent, or Firm* — Volpe and Koenig, P.C.

(57) ABSTRACT

A method and apparatus for optimization of a modem for high data rate applications comprise a plurality of hardware accelerators which are configured to perform data processing functions, wherein the hardware accelerators are parameterized, a processor is configured to selectively activate accelerators according to the desired function to conserve power requirements and a shared memory configured for communication between the plurality of hardware accelerators.

11 Claims, 8 Drawing Sheets

OTHER PUBLICATIONS

Third Generation Partnership Project, "Technical Specification Group Radio Access Network; Medium Access Control (MAC) Protocol Specification (Release 5)." 3GPP TS 25.321, V5.13.0, (Mar. 2007).

Third Generation Partnership Project, "Technical Specification Group Radio Access Network; Medium Access Control (MAC) Protocol Specification (Release 5)." 3GPP TS 25.321, V5.14.0, (Sep. 2008).

Third Generation Partnership Project, "Technical Specification Group Radio Access Network; Medium Access Control (MAC) Protocol Specification (Release 6)." 3GPP TS 25.321, V6.13.0, (Jun. 2007).

Third Generation Partnership Project, "Technical Specification Group Radio Access Network; Medium Access Control (MAC) Protocol Specification (Release 6)." 3GPP TS 25.321, V6.16.0, (Sep. 2008).

Third Generation Partnership Project, "Technical Specification Group Radio Access Network; Medium Access Control (MAC) Protocol Specification (Release 7)." 3GPP TS 25.321, V7.5.0, (Jun. 2007).

Third Generation Partnership Project, "Technical Specification Group Radio Access Network; Medium Access Control (MAC) Protocol Specification (Release 7)." 3GPP TS 25.321, V7.10.0, (Sep. 2008).

Third Generation Partnership Project, "Technical Specification Group Radio Access Network; Medium Access Control (MAC) Protocol Specification (Release 8)." 3GPP TS 25.321, V8.3.0, (Sep. 2008).

Third Generation Partnership Project, "Technical Specification Group Radio Access Network; Radio Link Control (RLC) Protocol Specification (Release 1999)." 3GPP TS 25.322, V3.18.0, (Jun. 2004).

Third Generation Partnership Project, "Technical Specification Group Radio Access Network; Radio Link Control (RLC) Protocol Specification (Release 4)." 3GPP TS 25.322, V4.12.0, (Jun. 2004).

Third Generation Partnership Project, "Technical Specification Group Radio Access Network; Radio Link Control (RLC) Protocol Specification (Release 5)." 3GPP TS 25.322, V5.13.0, (Dec. 2005).

Third Generation Partnership Project, "Technical Specification Group Radio Access Network; Radio Link Control (RLC) Protocol Specification (Release 6)." 3GPP TS 25.322, V6.10.0, (Jun. 2007).

Third Generation Partnership Project, "Technical Specification Group Radio Access Network; Radio Link Control (RLC) Protocol Specification (Release 6)." 3GPP TS 25.322, V6.12.0, (May 2008).

Third Generation Partnership Project, "Technical Specification Group Radio Access Network; Radio Link Control (RLC) Protocol Specification (Release 7)." 3GPP TS 25.322, V7.3.0, (Jun. 2007).

Third Generation Partnership Project, "Technical Specification Group Radio Access Network; Radio Link Control (RLC) Protocol Specification (Release 7)." 3GPP TS 25.322, V7.8.0, (Sep. 2008).

Third Generation Partnership Project, "Technical Specification Group Radio Access Network; Radio Link Control (RLC) Protocol Specification (Release 8)." 3GPP TS 25.322, V8.3.0, (Sep. 2008).

Third Generation Partnership Project, "Technical Specification Group Radio Access Network; Packet Data Convergence Protocol (PDCP) Specification (Release 1999)." 3GPP TS 25.323, V3.10.0, (Sep. 2002).

Third Generation Partnership Project, "Technical Specification Group Radio Access Network; Packet Data Convergence Protocol (PDCP) Specification (Release 4)." 3GPP TS 25.323, V4.6.0, (Sep. 2002).

Third Generation Partnership Project, "Technical Specification Group Radio Access Network; Packet Data Convergence Protocol (PDCP) Specification (Release 5)." 3GPP TS 25.323, V5.9.0, (Dec. 2006).

Third Generation Partnership Project, "Technical Specification Group Radio Access Network; Packet Data Convergence Protocol (PDCP) Specification (Release 5)." 3GPP TS 25.323, V5.10.0, (Dec. 2007).

Third Generation Partnership Project, "Technical Specification Group Radio Access Network; Packet Data Convergence Protocol (PDCP) Specification (Release 6)." 3GPP TS 25.323, V6.10.0, (Jun. 2007).

Third Generation Partnership Project, "Technical Specification Group Radio Access Network; Packet Data Convergence Protocol (PDCP) Specification (Release 6)." 3GPP TS 25.323, V6.11.0, (Dec. 2007).

Third Generation Partnership Project, "Technical Specification Group Radio Access Network; Packet Data Convergence Protocol (PDCP) Specification (Release 7)." 3GPP TS 25.323, V7.5.0, (Jun. 2007).

Third Generation Partnership Project, "Technical Specification Group Radio Access Network; Packet Data Convergence Protocol (PDCP) Specification (Release 7)." 3GPP TS 25.323, V7.7.0, (Dec. 2007).

Third Generation Partnership Project, "Technical Specification Group Radio Access Network; Packet Data Convergence Protocol (PDCP) Specification (Release 8)." 3GPP TS 25.323, V8.2.0, (Sep. 2008).

Third Generation Partnership Project, "Technical Specification Group Radio Access Network; Radio Resource Control (RRC) Protocol Specification (Release 1999)." 3GPP TS 25.331, V3.21.0, (Dec. 2004).

Third Generation Partnership Project, "Technical Specification Group Radio Access Network; Radio Resource Control (RRC) Protocol Specification (Release 4)." 3GPP TS 25.331, V4.17.0, (Mar. 2005).

Third Generation Partnership Project, "Technical Specification Group Radio Access Network; Radio Resource Control (RRC) Protocol Specification (Release 4)." 3GPP TS 25.331, V4.19.0, (May 2008).

Third Generation Partnership Project, "Technical Specification Group Radio Access Network; Radio Resource Control (RRC) Protocol Specification (Release 5)." 3GPP TS 25.331, V5.19.0, (Dec. 2006).

Third Generation Partnership Project, "Technical Specification Group Radio Access Network; Radio Resource Control (RRC) Protocol Specification (Release 5)." 3GPP TS 25.331, V5.22.1, (Aug. 2008).

Third Generation Partnership Project, "Technical Specification Group Radio Access Network; Radio Resource Control (RRC) Protocol Specification (Release 6)." 3GPP TS 25.331, V6.14.0, (Jun. 2007).

Third Generation Partnership Project, "Technical Specification Group Radio Access Network; Radio Resource Control (RRC) Protocol Specification (Release 6)." 3GPP TS 25.331, V6.19.0, (Sep. 2008).

Third Generation Partnership Project, "Technical Specification Group Radio Access Network; Radio Resource Control (RRC) Protocol Specification (Release 7)." 3GPP TS 25.331, V7.5.0, (Jun. 2007).

Third Generation Partnership Project, "Technical Specification Group Radio Access Network; Radio Resource Control (RRC) Protocol Specification (Release 7)." 3GPP TS 25.331, V7.10.0, (Sep. 2008).

Third Generation Partnership Project, "Technical Specification Group Radio Access Network; Radio Resource Control (RRC) Protocol Specification (Release 8)." 3GPP TS 25.331, V8.4.0, (Sep. 2008).

Third Generation Partnership Project, "Technical Specification Group Radio Access Network; Medium Access Control (MAC) Protocol Specification (Release 7)." 3GPP TS 25.321, V7.10.0, (Sep. 2007).

Third Generation Partnership Project, "Technical Specification Group Radio Access Network; Radio Link Control (RLC) Protocol Specification (Release 5)." 3GPP TS 25.322, V5.13.0, (Dec. 2004).

* cited by examiner

UMTS FDD MODEM OPTIMIZED FOR HIGH DATA RATE APPLICATIONS

CROSS REFERENCE TO RELATED APPLICATIONS

This application claims the benefit of U.S. Provisional Application No. 60/980,826, filed Oct. 18, 2007 and U.S. Provisional Application No. 61/012,605, filed Dec. 10, 2007, which are incorporated by reference as if fully set forth.

FIELD OF INVENTION

This application is related to wireless communications.

BACKGROUND

With advances in wireless technology, 3G networks are enabling network operators to offer users a wider range of more advanced services while achieving greater network capacity through improved spectral efficiency. These services include not only improved voice calls, but multimedia messaging, and broadband wireless data, all in a mobile environment. The Third Generation Partnership Project (3GPP) Long Term Evolution (LTE), for example, may offer downlink peak rates of at least 100 Mbit/s, 50 Mbit/s in the uplink and RAN (Radio Access Network).

As wireless mobile equipment becomes more data centric, increases in required data rates are outpacing improvements in central processing unit (CPU) clock speeds (and power efficiency at the speeds). The 3GPP standards body continues to develop additional features and capabilities to provide these higher data rates. At the same time, users are demanding smaller and more power efficient designs. The modem footprint and power consumption must not grow in proportion with data rates. Accordingly, an extensible architecture is desired for supporting the 3GPP evolution while meeting the user requirements for efficient design.

SUMMARY

A method and apparatus for optimization of a wireless modem are disclosed. A plurality of hardware accelerators are configured to perform data processing functions, wherein the hardware accelerators are parameterized. A processor is configured to selectively activate the plurality of hardware accelerators according to the desired function, and a shared memory is selectively configured for communication between the plurality of hardware accelerators.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
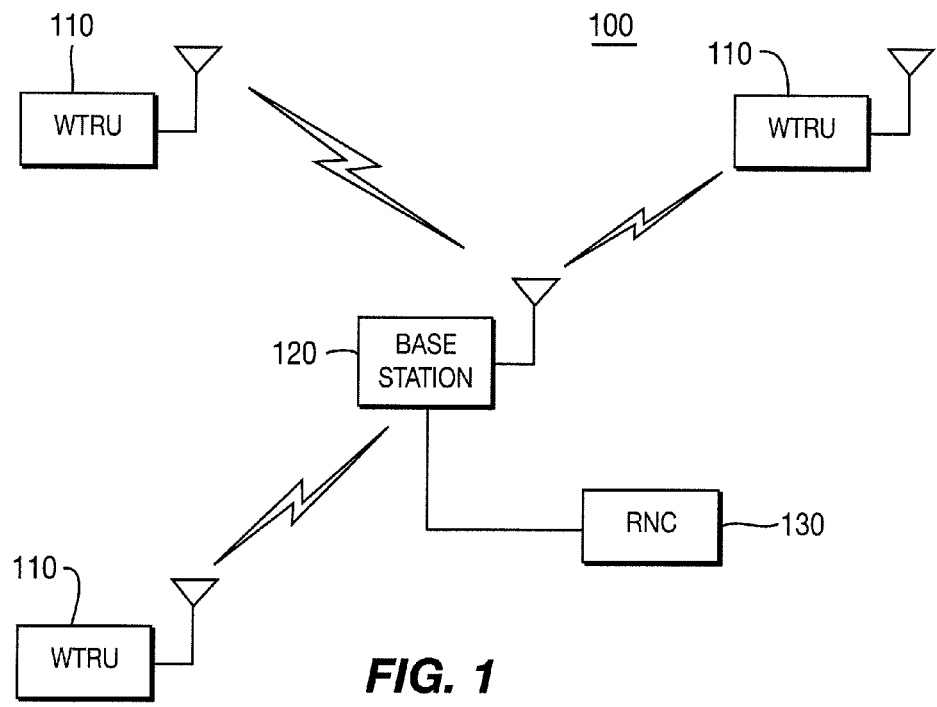
FIG. 1 shows a wireless communication system 100 including a plurality of WTRUs 110, a base station 120, and an RNC 130.

FIG. 1 shows a wireless communication system 200 including a plurality of WTRUs 110, a base station 120, and an RNC 130. As shown in FIG. 1, the WTRUs 110 are in communication with the base station 120, which is in communication with the RNC 130. Although three WTRUs 110, one base station 120, and one RNC 130 are shown in FIG. 1, it should be noted that any combination of wireless and wired devices may be included in the wireless communication system 100. For example, although the RNC 130 is shown in the wireless communication system 100, the RNC 130 may not be included in an LTE system.

Figure 1A:
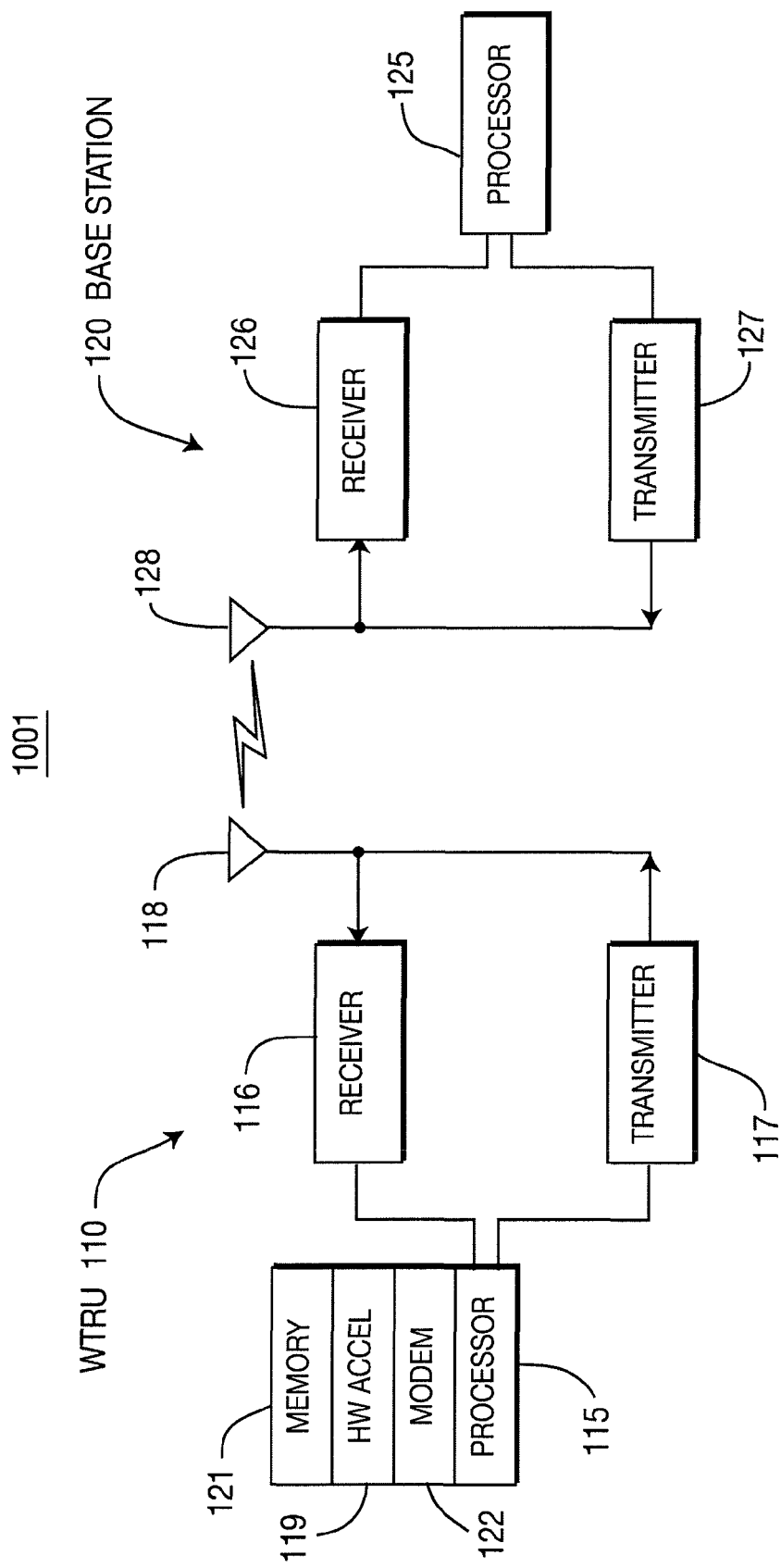
FIG. 1A is a functional block diagram 200 of a WTRU 110 and the base station 120 of the wireless communication system 100 of FIG. 1.

FIG. 1A is a functional block diagram of a WTRU 110 and the base station 120 of the wireless communication system 100 of FIG. 1. As shown in FIG. 1A, the WTRU 110 is in communication with the base station 120 and both are configured to perform a method for optimizing a modem for high data rate applications.

In addition to the components that may be found in a typical WTRU, the WTRU 110 includes a processor 115, a receiver 116, a transmitter 117, an antenna 118, a hardware acceleration module 119, a memory module 121, and a modem 122. The processor 115 is configured to perform a method for optimizing a modem for high data rate applications. The receiver 116 and the transmitter 117 are in communication with the processor 115. The antenna 118 is in communication with both the receiver 116 and the transmitter 117 to facilitate the transmission and reception of wireless data.

In addition to the components that may be found in a typical base station, the base station 120 includes a processor 125, a receiver 126, a transmitter 127, and an antenna 128. The processor 125 is configured to perform a method for optimizing a modem for high data rate applications. The receiver 126 and the transmitter 127 are in communication with the processor 125. The antenna 128 is in communication with both the receiver 126 and the transmitter 127 to facilitate the transmission and reception of wireless data.

When referred to hereinafter, the term hardware accelerator 119 may be used to refer to any modules within the hardware accelerator 119.

When referred to hereinafter, processor 115 may be used to refer to any of the modules within the processor 115.

Figure 2:
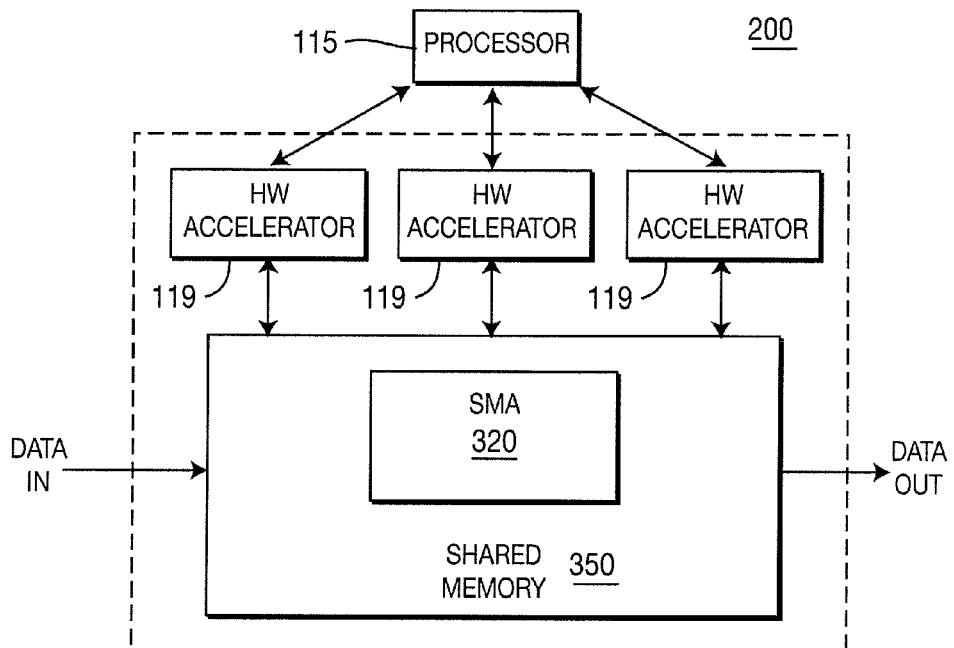
FIG. 2 is a block diagram of a modem.

FIG. 2 shows a block diagram of a modem 200 including a processor 115, a shared memory arbiter (SMA) 320, shared memory (SM) 350, and a plurality of HW accelerators 119. The processor 115 may be configured to perform Layer 1 (L1), Layer 2 (L2), and Layer 3 (L3) processing. The HW accelerators 119 may be configured and activated by the processor 115. The hardware accelerators 119 may be configured to handle modem data (i.e. voice and data traffic), while the processor 115 may be configured to provide control using parameters that control how the modem data passes through the hardware accelerators 119 and not through the processor 115. Accordingly, as shown in FIG. 2, modem data primarily passes through the hardware accelerators 119. The hardware accelerators 119 may further be configured to pass data to other hardware accelerators 119 through the SM 350. The SMA 320 controls the hardware accelerators' 119 access to the SM 350. Accordingly modem data may be processed through the hardware accelerators 119 without requiring the modem data to pass through the processor 115.

Each hardware accelerator 119 or sub-system (multiple hardware accelerators 119) may be semi-autonomous, meaning that a start signal may power-up the appropriate hardware accelerators 119 and initiate processing. As a result, processor 115 loading may grow only minimally with increasing data rate. Signal processing functions may also be implemented in the hardware accelerators 119. Upon completion of a task, clocks and power domains may be turned off. Each of the hardware accelerators 119 may be programmed to signal an indication to other hardware accelerators 119 when they complete a particular task. By allowing each of the hardware accelerators 119 to start other hardware accelerators 119, the processor 115 may be more autonomous from the hardware accelerators 119.

Figure 3:
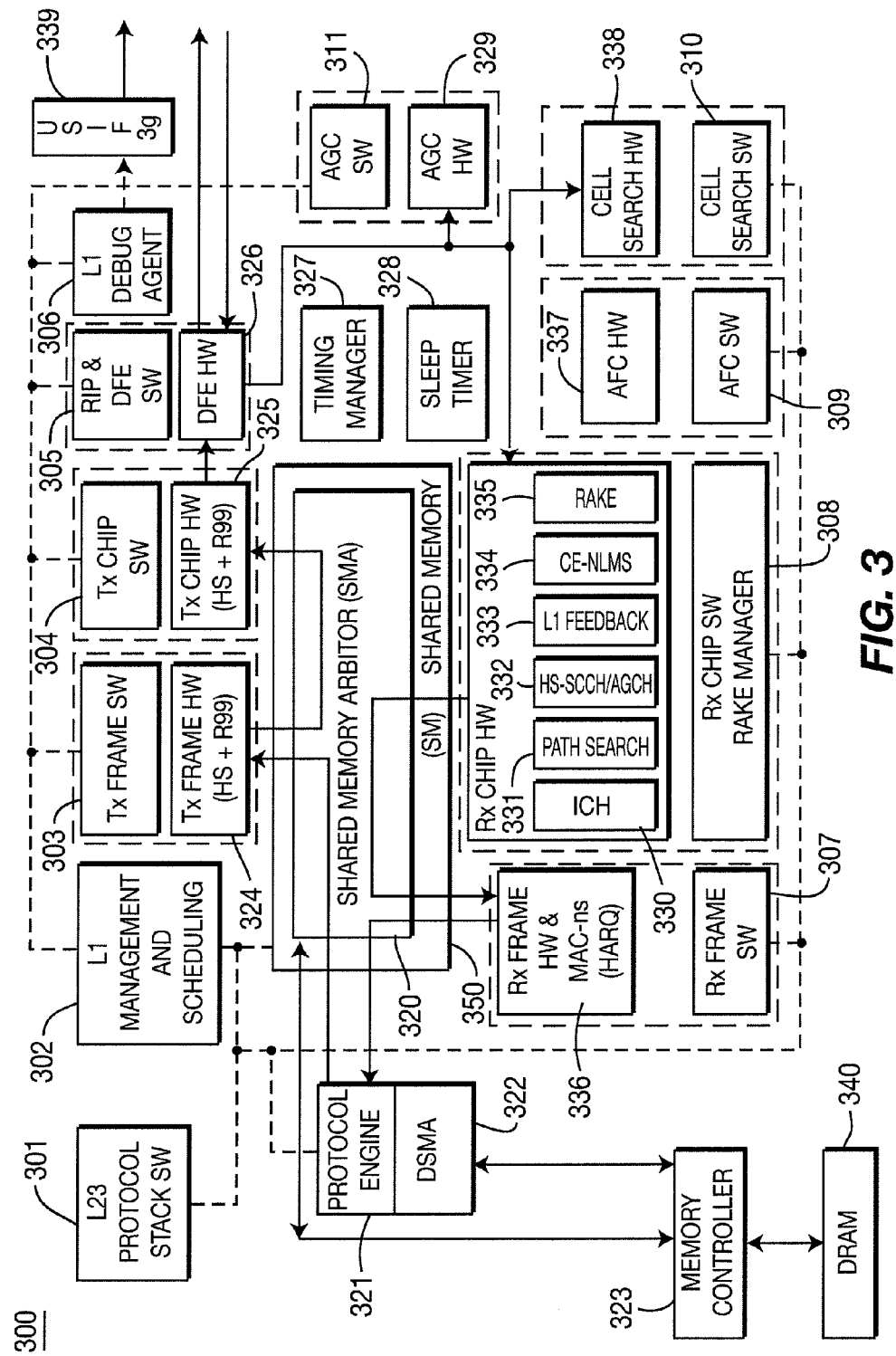
FIG. 3 shows an embodiment of the modem of FIG. 2.

FIG. 3 shows one example of the modem of FIG. 2. The functionality of the processor 115 shown in FIG. 2 may be split up into multiple modules. The processor 115 may comprise an L23 protocol stack module 301, an L1 manager and scheduler 302, a Transmission (Tx) Frame software (SW) module 303, a Tx Chip SW module 304, a radio interface processor (RIP) and Digital Front End (DFE) SW module 305, an L1 Debug Agent Module 306, a Receive (Rx) Frame SW module 307, an Rx Chip/Rake Manager 308 an Automatic Frequency Control (AFC) SW module 309, a cell search (CS) module 310, and an Automatic Gain Control (AGC) SW module 311. The functionality of the hardware accelerators 119 as shown in FIG. 2 may be further divided among a plurality of hardware accelerators shown in FIG. 3, the hardware accelerators 119 include a Protocol Engine (PE) 321, a DRAM Shared Memory Arbiter (DSMA) 322, a Memory Controller 323, a Tx Frame HW module 324, a Tx Chip HW module 325, a DFE HW module 326, a timing manager 327, a sleep timer 328, an AGC HW module 329, an indicator channel (ICH) module 330, a Path Search module 331, an HS-SCCH/AGCH module 332, an L1 Feedback Module 333, a channel estimation enhanced normalized least mean squares (CE-NLMS) module 334, a Rake module 335, an Rx Frame HW and MAC-hs module 336, an AFC HW module 337, a cell search HW module 338, and a universal serial interface (USIF) module 339. The HW accelerators 119 may be configured and activated by the modules of the processor 115.

The SM 350 may be configured to provide data connectivity between hardware accelerators 119, to provide configuration of the hardware accelerators 119 via a processor 115, and as an interface to a host processor. The SM 350 and the SMA 320 may allow efficient extensibility by allowing memory to be shared in support of functions that operate in mutually exclusive states. Buffer space is allocated in the SM 350. Buffers may provide memory storage for component input and outputs. The SM 350 may be partitioned to provide reuse of buffers for processes that do not run at the same time.

In order to reduce or eliminate traffic data from entering the processor 115, the HW accelerators 119 may be programmed and scheduled to autonomously process data. The timing manager 327 may be configured to issue start pulses when fine-grained timing is needed. A linked list of control blocks may be configured to de-couple setup and execution of the hardware accelerators 119. Control of the components may be configured a frame ahead of time, wherein the hardware accelerators 119 may be configured to interrupt the processor 115 upon completion of a function, or at an end of the linked list of control blocks. Upon completion of a task, a hardware accelerator 119 may be configured to trigger operation of another hardware accelerator 119.

Figure 4:
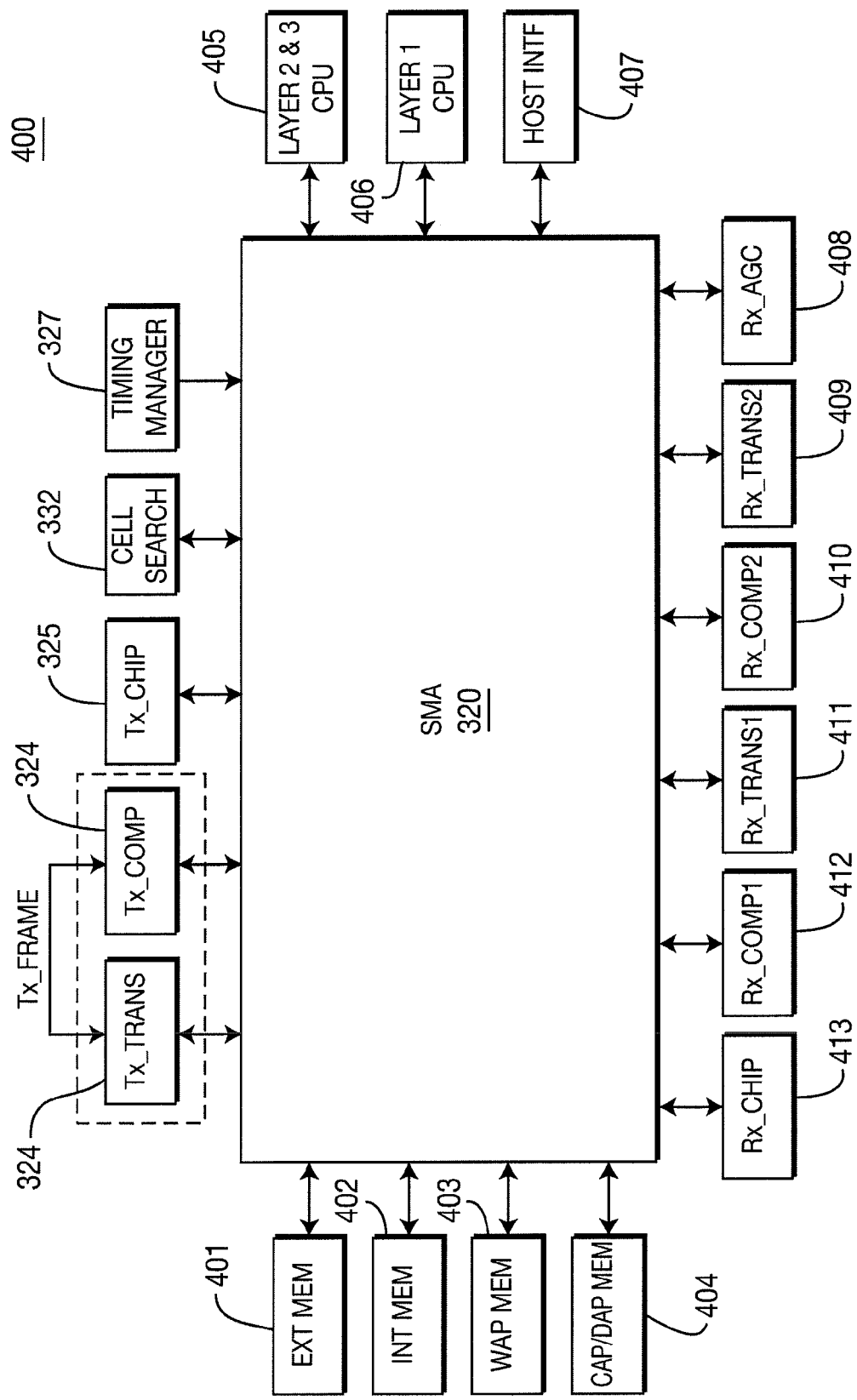
FIG. 4 shows the Shared Memory Arbiter (SMA) of FIG. 1.

FIG. 4 shows the SMA 320. As shown in FIG. 4, the SMA 320 may be configured to communicate with a plurality of other modules including the Tx Frame HW module 324, the Tx Chip SW module 304, the CS module 338, the timing manager 327, a Layer 2 & 3 CPU 405, a Layer 1 CPU 406, a host interface 407, an Rx AGC module 408, an Rx Transceiver2 module 409, an Rx Comp2 module 410, an Rx Transceiver1 module 411, an Rx Comp1 module 412, an Rx Chip 413, a CAP/DAP memory 404, a WAP memory 403, an internal memory 402, and an external memory 401. The SMA 320 may be configured to control access to memory shared by any hardware accelerator 119, the processor 115, and a host interface. The SMA 320 may comprise address registers and sequencing logic. The SMA 320 may be configured to allow the hardware accelerators 119 and the processor 115 to efficiently share access to available memory 350. The external memory 401 may be added to extend the amount of available SDRAM.

The SM 350 may comprise the WAP memory 403 and the CAP/DAP memory 404. The SM 350 may be configured to store pointers that are written to the SMA 320. The CAP/DAP memory 404 may be configured to store pointers for SMA channels that are used to read control information. The CAP/DAP memory 404 may further be configured to store pointers for SMA channels that are used to read/write data.

The timing manager 327 may be configured to maintain system time and to create pulses based on specific frame/slot/chip times. The pulses may be used to start modules and/or create interrupts. The timing manager 327 may also include controller, (e.g. ARM interrupt controllers). The signal output by the timing manager 327 may be used by the Layer 1 manager and scheduler 203 to synchronize the operation of all other modules.

The sleep timer 328 may be configured to provide the countdown and mechanism to power the modules of the modem 122 (e.g. when the L1 CPU 406 enters a sleep state). The sleep timer 328 may be configured to utilize a low-power, low-accuracy 32.768 kHz real-time clock (RTC) to count during sleep. Higher precision may be obtained by calibrating the RTC against a more accurate microcontroller when the 3G L1 CPU 406 is awake in-between sleep cycles.

Referring to FIG. 4, the L1 CPU 406 may be configured to enter sleep states if a cell search fails after initialization, in frequency division duplexing (FDD) discontinuous reception (DRX) mode, or in GSM mode.

Referring back to FIG. 3, the Tx Frame HW module 324 and the Tx Frame SW 303 may collectively be referred to as a Tx Frame component. The Tx Frame HW module 324 may be configured to perform symbol rate processing on transport and composite channels for FDD uplink (E-DCH and DCH). The Tx Frame HW module 324 may accept data in transport blocks from Layer 2/3 and map this data to physical channels. Data is sent to the Tx Chip HW module 325 via the SMA 320.

The Tx Chip SW module 304 and the Tx Chip HW module 325 may be collectively referred to as the Tx Chip component. The Tx Chip HW module 325 may be configured to process coded binary data from Tx Frame HW module 324 along with control channel information to properly format data for uplink transmission through the Radio Interface. The Tx Chip component may be configured to handle transmit power control and transmit timing functions. The Tx Chip component may also be configured to processes data on a Physical Random Access Channel (PRACH), Dedicated Physical Data Channel (DPDCH)/Dedicated Physical Control Channel (DPCCH), High-Speed DPCCH (HS-DPCCH), and Enhanced DPCCH (E-DPDCH)/DPCCH. The Tx Chip component may be further configured to transmit data to the DFE HW module 326.

The CS HW module 338 and the CS Search SW 310 may be collectively referred to as a CS component. The CS HW module 338 may be configured to perform initial cell selection (ICS) procedure. The ICS procedure includes detecting the strongest cell when no cell identifier or timing information is known, and determining whether or not Space Time Transmit Diversity (STTD) is utilized on that cell. The CS HW module 338 may be configured to provide synchronization information for the found cell. The CS HW module 338 may further be configured to perform neighbor or serving cell measurements, which comprises detection, identification, and measurement of listed and unlisted intra-frequency neighbor cells and listed inter-frequency neighbor cells, and measurement of the serving cell. Measurements may include Common Pilot Channel (CPICH) Received Signal Code Power (RSCP); CPICH received pilot energy to total spectral density ratio (Ec/Io), and determination of the first significant path for each cell. As part of a CPICH Ec/Io determination procedure, the CS HW module 338 may be configured to measure a Received Signal Strength Indicator (RSSI) on each frequency. The CS HW module 338 may further be configured to perform a targeted cell search (TCS) procedure. The TCS procedure may comprise detection and synchronization to a particular cell (used for handover to cells that have not recently been measured). The CS HW module 338 may further be configured to perform a Public Land Mobile Network (PLMN) ID search on Universal Mobile Telecommunications System (UMTS) cell in a UMTS only mode. The CS HW module 338 may further be configured to perform GSM Inter-RAT Measurements and PLMN ID search in UMTS neighbors.

The AGC SW 311 and the AGC HW module 329 may be collectively referred to as an AGC component. The AGC HW module 329 may be configured to control the signal power level seen at an Analog to Digital Converter (ADC) input, which may be coupled to the DFE HW module 326. Alternatively the AGC component may be configured to adhere to the DigRF standard.

The AFC HW module 337 and the AFC SW 309 may be collectively referred to as the AFC component. The AFC HW module 337 may be configured to provide an estimated carrier frequency offset error signal, between the base station 120 and the WTRU 110, to a WTRU 110 radio interface.

The AGC HW module 329 and the AGC SW module 311 collectively may be referred to as the AGC component. The AGC component may be configured to support both a primary receive path and a diversity receive path. The AFC HW module 337 may be configured to estimate and cancel the carrier frequency offset on the received signal. The AFC HW module 337 operates only on a main radio temperature controlled crystal oscillator (a single clock is distributed to both radios).

The RIP and DFE SW module 305 and the DFE HW module 326 may collectively be referred to as the radio interface component. The radio interface component may be configured to connect 2G/3G radios to the modem front end. The radio interface component may be configured to provide parallel transmit and receive I/Q data paths over which data is transferred between the modem and the radio. Additional control interfaces may initialize the radios and transfer control information between the radio and the modem. The radio interface component may be configured for communication via three separate radio interfaces including a 3G main radio interface, a 3G diversity radio interface, and a 2G radio interface. The radio interface component may comprise a three-wire interface for programming and enabling the receiver for each radio interface. The three-wire interface (clock, data, and enable) is a bi-directional synchronous serial bus which provides the capability to access multiple devices using an address/data protocol. This three-wire interface provides separate enables for each radio. The radio interface component may further be configured to provide the capability of enabling a second radio (via the 3-wire interface) to provide a diversity path (or multi-path) in 3G mode on the receive side in order to increase performance with HSDPA.

The RIP 305 may be programmable and is compatible with a wide variety of radios. The RIP 305 may be configured to perform data transfers and logic operations and controls the three-wire interface to any 3G radios. The RIP 305 may also provide controls on the radio interface for frequency selection and gain control, transmit power control (TPC) and power amp bias control, and for switching the antenna at the radio output between 3G and GSM mode.

The DFE HW module 326 may comprise a receive DFE (Rx DFE) and a transmit paths DFE (Tx DFE). The DFE HW module 326 may be configured to filter and correct 3G digital signals on the Rx DFE and the Tx DFE. The modem 122 may include independent DFE chains for both primary and diversity radio receivers. The Rx DFE may be configured to perform for low-pass filtering and decimating over-sampled and noise-shaped signals from an analog front end (AFE), removing DC offsets, and performing final band-selection and pulse shaping. The Tx DFE may be configured to perform pulse shaping, DC offset and IQ-amplitude correction, up sampling, and noise shaping before applying the signal to the AFE.

The Rx Chip/Rake Manager 308 may be configured to perform demodulation and channel estimation. The RX Chip/Rake Manager 308 may further be configured to decode transport channel control data, (transport format combination indicator (TFCI), HS-SCCH), indicator channels, (e.g. acquisition indicator channel (AICH), physical indicator channel (PICH), ICH), and High speed uplink packet access (HSUPA) Grant channels (E-AGCH, E-RGCH, E-HICH), and to compute feedback bits (feedback indicator (FBI), transmission power command (TPC), channel quality indicator (CQI)) to be transmitted on the uplink. The demodulated data may be provided to Rx Frame HW module 336 through SMA 320 memory. The Rx Chip/Rake Manager 308 may be configured to control hardware accelerators 330-335. The Rx Chip/Rake Manager 308 may be configured to allocate and de-allocate fingers of the Rake. The Rx Chip/Rake Manager 308 may allocate Rake fingers to a cell for a path at a particular location (time delay) when the Path Searcher 331 reports the presence of a high-quality path that does not already have a Rake finger allocated to that path. Once initiated, the Rake module 335 may autonomously track the path as its location changes over time, periodically reporting the updated location and signal quality of the path to the Rx Chip/Rake Manager 308. The Rx Chip/Rake Manager 308 may de-allocate allocated Rake fingers when the signal quality reported by the Rake finger sufficiently degrades (however, the Rx Chip/Rake Manager 308 may not drop fingers that are experiencing only relatively short fades) or are reallocated to stronger paths (and possibly to other cells). The Rx Chip/Rake Manager 308 may also be configured to detect the case of finger collision and either drop one of the two colliding fingers or organizes colliding fingers into clusters.

The Rake module 335 may be configured to demodulate data from the physical channels for dedicated, common, and shared type channels. The RX Chip/Rake manager 308 may comprise an alignment buffer for alignment of paths from the serving cell as well as from other Node-Bs in an active set and neighbor cells for measurement purposes. The Rake module 335 may perform de-scrambling and detection for multiple channelization codes.

The CE-NLMS equalizer 334 may be configured to mitigate multipath interference that may be introduced by the channel. The CE-NLMS equalizer 334 may comprise an adaptive finite impulse response (FIR) filter where the adaptation process is based on a CE-NLMS algorithm. The CE-NLMS algorithm is based on the standard LMS algorithm with a modification that is designed to combat gradient noise amplification when the magnitude of the input vector is large. The CE-NLMS equalizer 334 may be configured to support WTRU receiver diversity and Node-B transmit diversity. The CE-NLMS equalizer 334 may be configured to operate on the HS-DPDCH and HS-SCCH channels.

The ICH module 330 may be configured to detect the E-RGCH, E-HICH, AICH, PICH, and MICH channels. For the E-RGCH, the radio links in the E-DCH serving radio link set may be soft combined. For the E-HICH, for each Radio Link Set (RLS), all the radio links may be soft combined. The ICH module 330 may comprise shared hardware to support detection of these channels.

The Path Searcher 331 may be configured to detect path (multipath) locations and signal the path locations together with metrics indicating the normalized average magnitude to the Rx Chip/Rake Manager 308. The Rx Chip/Rake Manager 308 may be configured to receive the path location information and assign Rake fingers to new paths.

The HS-SCCH/AGCH decoder 332 may be configured to perform decoding of the HS-SCCH channel. The HS-SCCH/AGCH decoder 332 may be reused for R6 upgrades to receive input from the Rake module 335 and demodulate the HSUPA DL E-AGCH channel.

The L1 Feedback module 333 may be configured to generate information that a Node-B may require from uplink channels to achieve certain link adaptation. For example, the information may comprise a downlink power control command, which is represented in TPC bits of uplink DPCCH; information for antenna weights, which is represented in the D field of FBI bits of an uplink DPCCH, that may be applied at the Node-B antennas when closed loop transmit diversity is applied; and channel quality, which may be represented in CQI bits of the uplink HS-DPCCH channel. In case of the closed loop transmit diversity (CLTD) mode, the L1 Feedback module 333 may also be configured to generate antenna weights that may be used for combining complex gains estimated by the Rake finger locations.

The Rx Frame HW module 336 and the Rx Frame SW 307 may be referred to collectively as the Rx Frame component. The Rx Frame HW module 336 may be configured to decode and de-multiplex the Coded Composite Transport Channel (CCTrCH), and process transport channels including Dedicated Channel (DCH), Broadcast Channel (BCH), Forward Access Channel (FACH), and the Paging Channel (PCH). The Rx Frame HW module 336 contains a high speed path (for HSDPA) and a regular speed path for DCH channels. The high speed path may be reused to support MBMS channels.

The Layer 1 Manager and Scheduler 302 may comprise a management and schedule entity. The management entity of the Layer 1 Manager and Scheduler 302 may be configured to perform control and status messaging to/from the higher layers (L2/3), and to indicate data availability, (e.g. data available in the SMA 320). The management entity may also comprise a layer 1 state machine. The scheduling entity of the Layer 1 Manager and Scheduler 302 may be configured to initiate the Layer 1 module functionality at the appropriate time and rate (e.g. slot rate scheduling, frame rate scheduling, etc.). The scheduling entity may also be configured to handle interrupts from the Layer 1 hardware and evaluate the cause of the interrupt to determine a next action. The Layer 1 Manager and Scheduler 302 may further be configured to perform power management of the Layer 1 subsystem by deciding which power islands may be enabled in which state, as will be discussed in greater detail hereafter. Power management may be used to reduce power in both active data and sleep states.

The PE 321 and DSMA 322 subsystem may be configured to provide Layer 2/3 hardware acceleration for modem transmit and receive operations. In one embodiment, the modem 122 may include three PEs 321, each comprising a Dedicated Programmable Controller (DPC) and a specialized data path, but quantity may be scaled to support other data rates. The DPC may be programmable to operate on multiple channel types (e.g., HSDPA, HSUPA, DCH, and MBMS) and dynamically switch between processing of each type. The PE 321 data path may interface with the SMA 320 through an SMA Interface node, and the SDRAM 340 through a DSMA interface node. The DSMA 322 may be configured to provide access for multiple modules within the modem to the external SDRAM subsystem 340. Each PE 321 may be configured to perform data movement, including the ability to gather data from various locations, perform bit alignment, and merge to a destination. Each PE 321 may also perform header interpretation, through the use of stream extract functionality. Each PE 321 may also perform header generation, through the use of cipher insert functionality. Each PE 321 may also perform cipher/de-cipher processing during data movement (when the ciphering engine option is enabled). Each PE 321 may also move data from SMA 320 to SDRAM 340 in downlink processing and move data from SDRAM 340 to SMA 320 in uplink processing The Layer 1 Debug Agent 306 may be configured to provide a serial interface (USIF) 339 to an external processor. The processor 115 may transmit diagnostic data through the USIF module 339.

The Layer 2/3 Protocol Stack module 301 may be configured to perform Radio Resource Control, Medium Access Control, Radio Link control, and Packet Data Convergence Protocol (PDCP) procedures. The Layer 2/3 Protocol Stack module 301 may also be configured to perform Non-Access Stratum procedures.

The Memory Controller 323 may be configured to connect on-chip controller cores, e.g., host processor, to a wide variety of external resources such as memories and peripherals, and allow flexible programming of the access parameters. The Memory Controller 323 may provide an Intel-style peripheral/device support and multiplexed access on the same bus. A plurality of memory devices may be connected to a host processor via one memory controller instance of an external bus unit.

Figure 5:
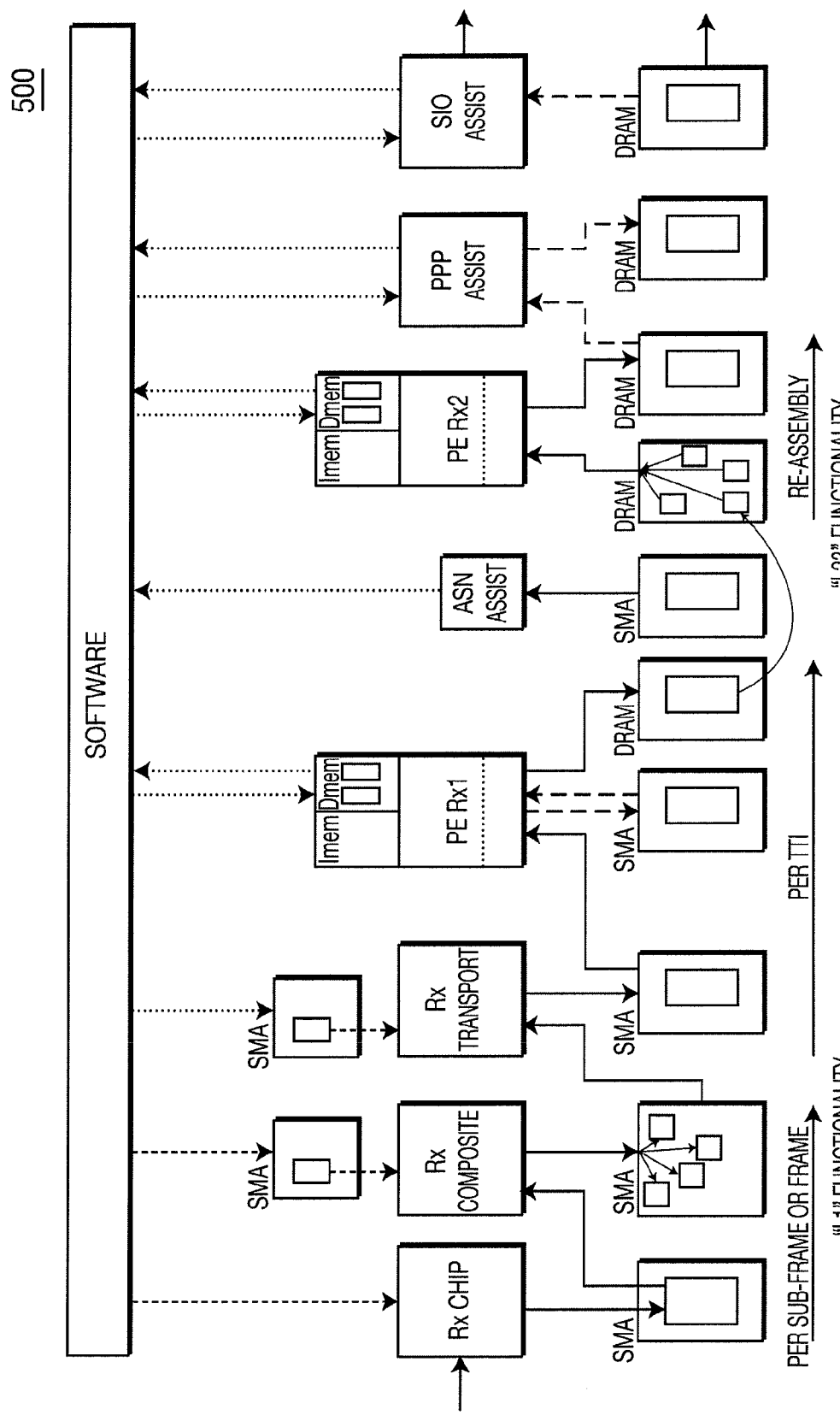
FIG. 5 shows a flow diagram of method of HW acceleration of downlink data.

FIG. 5 shows data flow for downlink data. Rx chip data is received in subframes or frames. The subframes or frames are demodulated into soft symbols and sent to the SMA, The SMA forwards the data to the Rx composite module, wherein the composite channels are then decomposed, de-ratematching, and de-interleaving are performed. The decomposed composite channels are then forwarded to the SMA. The SMA then forwards the data to the PE wherein the signal is then decoded, and CRC check is performed. The data may then be deciphered (if ciphering is enabled). The Headers are then stripped and PDU data is shifted from SMA to SDRAM. The PE then receives the data again and reorders and concatenates the data segments. If Point-to-Point Protocol (PPP) is being used, the data may be passed through a PPP Assist block, the PPP block may be configured to provide hardware support for some of the low-level functions required for PPP. The function of the PPP block may include byte stuffing, etc. If a "per bye" IO is needed, the signal may be passed through an Service Information Octet (SIO) assist module. The SIO assist module may be configured to handle low level interface between an application and the modem. In many cases this means that individual bytes must be manipulated. For example, many applications want to view the modem as though it is a Universal Asynchronous Receiver and Transmitter (UART). The SIO assist module may provide byte-to-word (word-to-byte) assist, monitor for access terminal command escape sequences, handle low level interface (i.e. USB) details, etc. These simple hardware assist functions may reduce the load on the main control processor.

Figure 6:
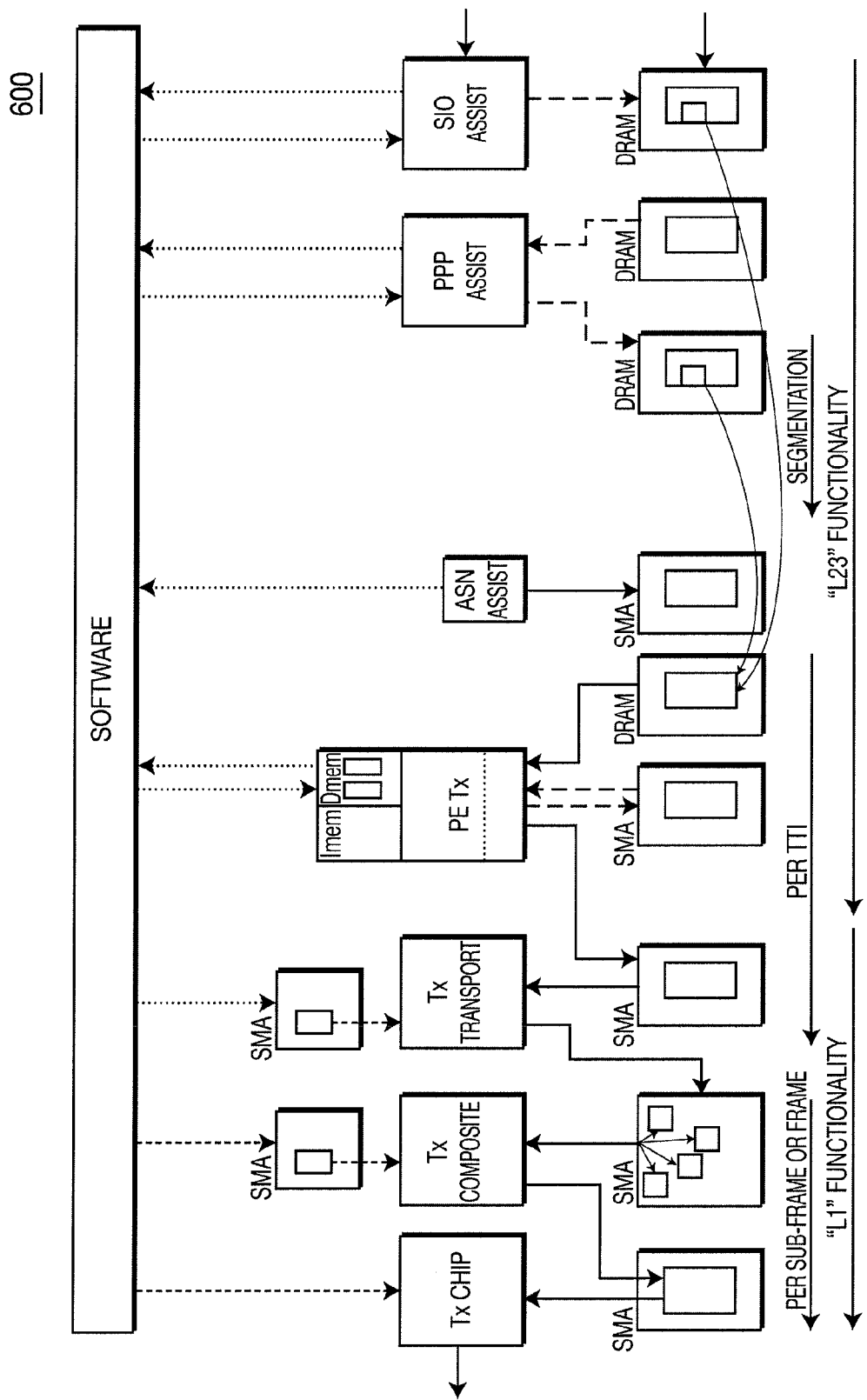
FIG. 6 shows a flow diagram of a method of HW acceleration in the uplink.

FIG. 6 shows data flow for uplink data. Transport block sets (resident in SMA) are partitioned (when necessary). The Tx Frame component may attach CRCs, encode data, perform rate matching and interleave the signal. The resulting channel coded data is placed back into the SMA 320 (each radio frame or subframe). The Tx Chip component pulls encoded data from the SMA 320, applies the appropriate scrambling code, spreads the data, etc. with the resulting data being streamed to the RF block (via the DFE HW module 326). As noted above, a PPP assist module and an SIO assist module may also be used in this procedure.

Figure 7A:
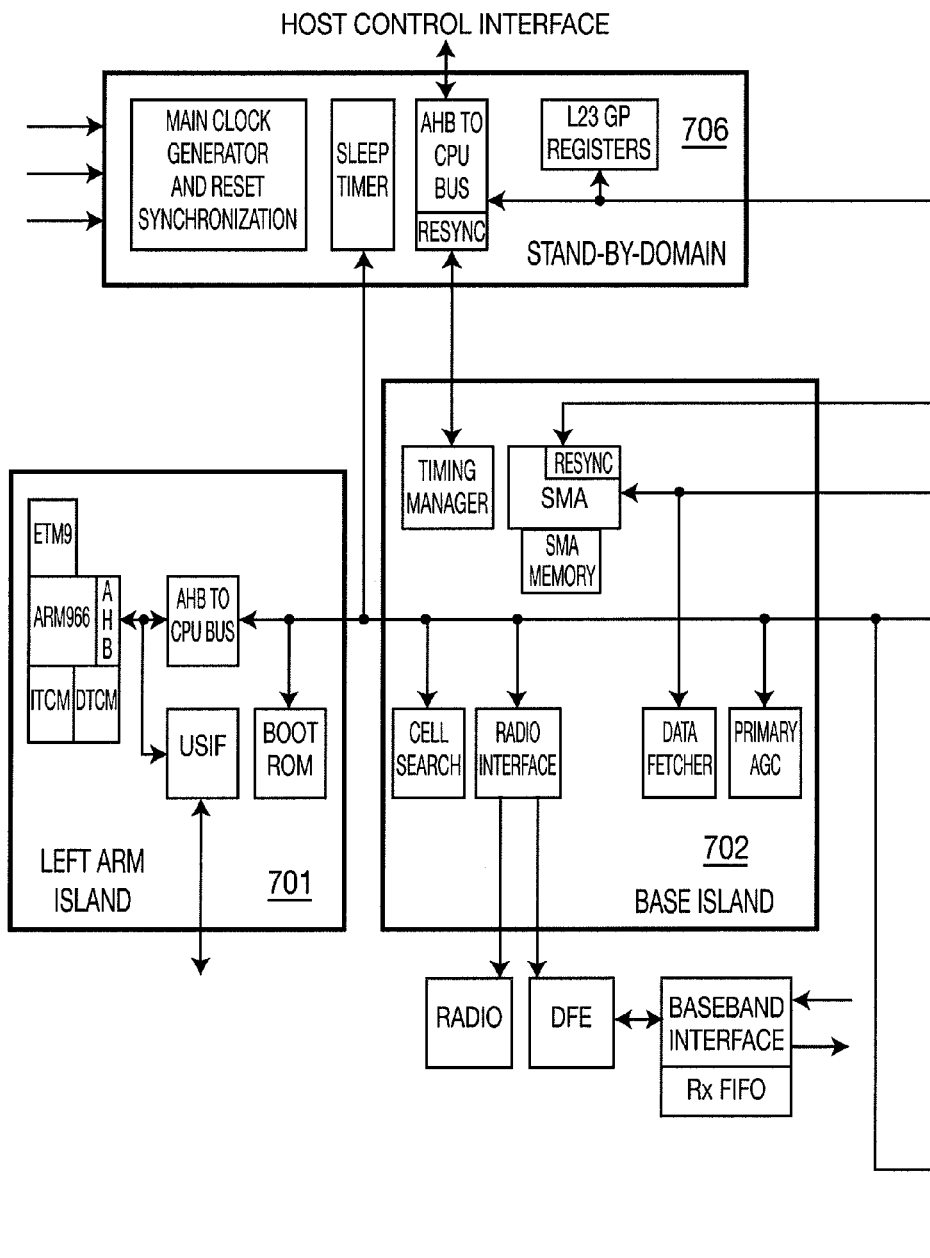
FIGS. 7A and 7B show a modem partitioned into different power domains to achieve more effective power management and power conservation.
Figure 7B:
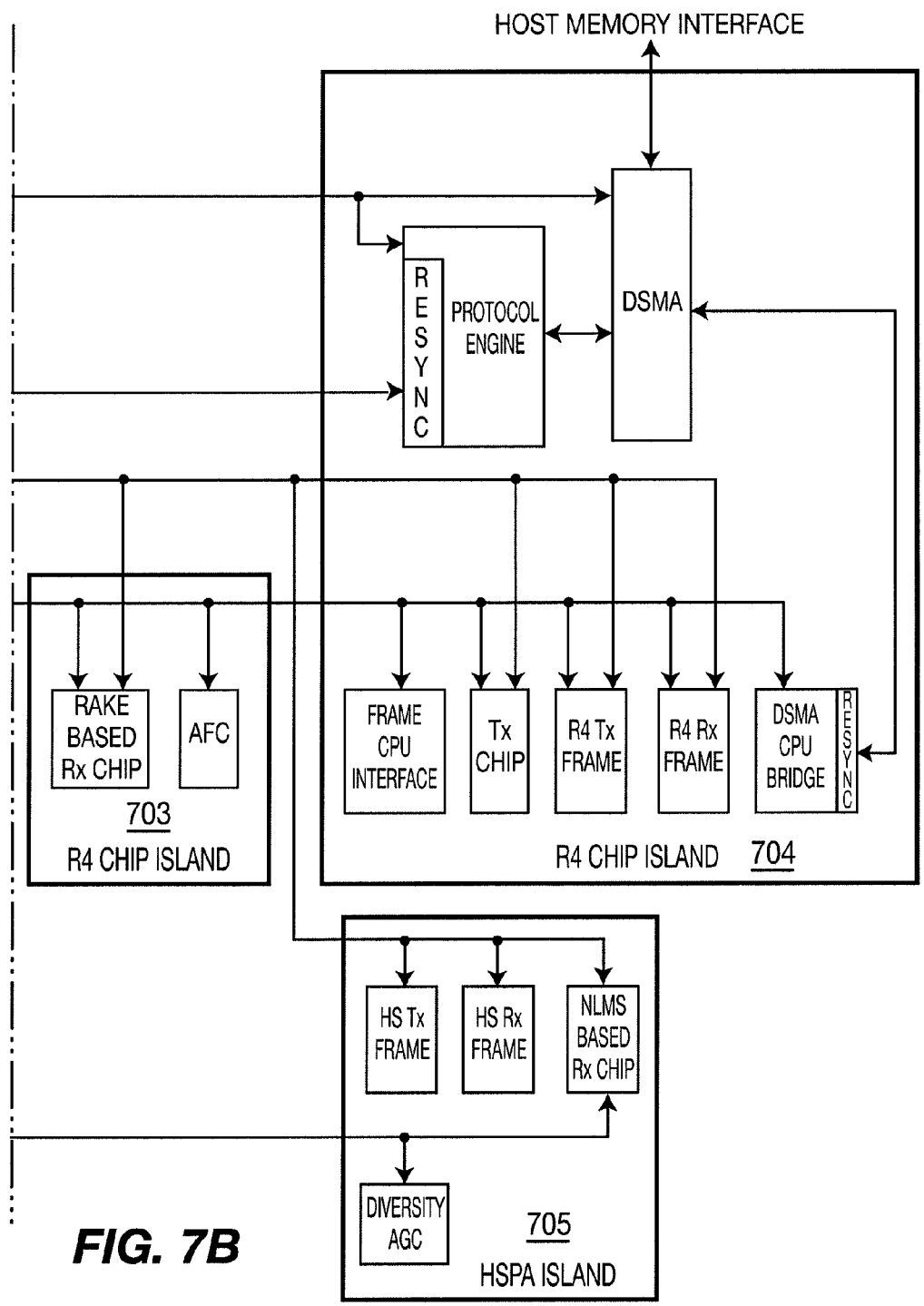

FIGS. 7A and 7B show a modem partitioned into different power domains to achieve more effective power management and power conservation. The modem 122 may be partitioned into discrete power domains called power islands. The partitioning may be based on functionality. FIGS. 7A and 7B include six power domains including a Left ARM island 701, a Base Island 702, an R4 Chip Island 703, an R4 Frame island 704, an HSPA Island 705, and a Stand-By Domain 706. While six power domains are shown, more or less power domains may be used based on the embodiment. The processor 115 may be configured to turn on each power domain only when its associated functionality is desired.

Referring to the power islands of FIGS. 7A and 7B, power management may be performed based on the operating mode of the modem. In a sleep mode, all power domains can be shut off during periods when no functionality is desired. The Sleep Timer 328, which runs off of a low-frequency crystal, may remain continuously powered. The processor 115 may be configured to program when the Sleep Timer 328 will turn off the other power domains and it may program the length of time the Sleep Timer 328 may wait before turning the power domains back on (wake-up). At each wake-up event, the Timing Manager 327 may resynchronize any timing manager counters. If no activity is required, sleep can be re-initiated. In one embodiment, the memories may remain powered on in low retention modes during sleep mode.

In Deep Sleep Mode, during long periods inactivity, (where synchronization of the timing manager 327 counter is not required), the modem 122 may be configured to remain a reset state. This may be performed by asserting a reset pin. During Deep Sleep mode all power islands may be powered off. A Wake-up procedure is not activated until the reset pin is de-asserted. After a reset, the modem 122 may be re-booted from an image that is already loaded in the processor's 115 TCM memories. Thus avoiding the need for a complete re-boot.

For Active Mode/Coarse Clock Gating, the hardware accelerators 119 may be partitioned into discrete clock domains. Each discrete clock domain may be enabled/disabled by the processor 115, a hardware accelerator 119, or both. Each discrete clock domain may be turned on only when its associated functionality is desired. Hardware accelerators may autonomously gate their clocks (i.e. turn off) at completion of their scheduled process.

In another embodiment, in order to reduce the hardware, various components that are commonly used in a UMTS modem may be shared or reused during various modem operating modes. The components that are shared may include, for example, a High Speed-Shared Control Channel (HS-SCCH) decoder for HS-SCCH decoding and Enhanced Dedicated Channel (E-DCH) Absolute Grant Channel (E-AGCH) decoding; a Rake Annex which handles the E-DCH HARQ Acknowledgement Indicator Channel (E-HICH), E-DCH Relative Grant Channel (E-RGCH) and E-AGCH and Multimedia Broadcast Multicast Service (MBMS); a Low Speed Frame Processing which handles R4 and MBMS; High Speed Frame Processing for High Speed Downlink Packet Access (HSDPA) and MBMS; an IR Buffer for HSDPA and MBMS; a Protocol Engine for HSDPA/High Speed Uplink Packet Access (HSUPA)/DCH/MBMS; L1 Feedback (Continuous Quality Improvement (CQI) and Transmit Power Control (TPC) generation) (Common Signal to Interference Ratio (SIR) estimator), and/or ICH (MICH/PICH/AICH).

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU), the WTRU comprising:
   a plurality of hardware accelerators configured to perform data processing for modem data;
   a processor configured to selectively activate the plurality of hardware accelerators and to provide control using parameters that control how the modem data passes through the hardware accelerators and not through the processor; and
   a shared memory which is selectively accessed by the plurality of hardware accelerators.

2. The WTRU of claim 1, further comprising:
   a shared memory arbiter configured to control access to the shared memory by the plurality of hardware accelerators.

3. The WTRU of claim 1 wherein the shared memory is operated by the processor for configuring at least one of the plurality of hardware accelerators.

4. The WTRU of claim 1 further comprising:
   a timing manager configured to provide time management and scheduling for the plurality of hardware accelerators.

5. The WTRU of claim 4 further comprising the at least one of the plurality of hardware accelerators having a clock configured to be disabled when not in use and being activated by the processor.

6. The WTRU of claim 1, the processor configured to provide time management and scheduling whereby the processor powers up a selected one of the plurality of hardware accelerators and initiates processing of the selected one of the plurality of hardware accelerators.

7. The WTRU of claim 5 wherein the at least one of the plurality of hardware accelerator's clock is configured to turn off when a function performed by the at least one of the plurality of hardware accelerators is completed.

8. The WTRU of claim 7 wherein the at least one of the plurality of hardware accelerators is configured to power down responsive to turn off of the at least one of the plurality of hardware accelerator's clock.

9. The WTRU of claim 1, further comprising:
   a sleep timer configured to provide the countdown and mechanism to power the plurality of hardware accelerators the processor enters a sleep state.

10. The WTRU of claim 1, wherein the processor is configured to perform Layer 1, Layer 2, and Layer 3 processing.

11. The WTRU of claim 1, wherein at least one of the plurality of hardware accelerators is configured transmit a signal to a second one of the plurality of hardware accelerators, wherein the signal activates the second one of the plurality of hardware accelerators.

* * * * *